(12) United States Patent
Frankel

(10) Patent No.: US 8,787,771 B2
(45) Date of Patent: Jul. 22, 2014

(54) ALL-OPTICAL REGENERATOR AND OPTICAL NETWORK INCORPORATING SAME

(75) Inventor: Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 1083 days.

(21) Appl. No.: 11/544,237

(22) Filed: Oct. 6, 2006

(65) Prior Publication Data

US 2008/0085125 A1  Apr. 10, 2008

(51) Int. Cl.
*H04B 10/00* (2013.01)
*H04J 14/02* (2006.01)

(52) U.S. Cl.
USPC .............. 398/175; 398/81; 398/147; 398/159

(58) Field of Classification Search
USPC ........... 398/173, 175, 176, 177, 178, 180, 17, 398/18, 19, 20, 22–24, 81, 147, 158, 159, 398/160
See application file for complete search history.

(56) References Cited

U.S. PATENT DOCUMENTS

| | | | |
|---|---|---|---|
| 6,046,841 A | 4/2000 | Mahgerefteh et al. | |
| 6,141,129 A | 10/2000 | Mamyshev | |
| 6,252,692 B1* | 6/2001 | Roberts | 398/147 |
| 6,317,232 B1 | 11/2001 | Fee et al. | |
| 6,335,819 B1 | 1/2002 | Cho et al. | |
| 6,396,607 B1 | 5/2002 | Cao | |
| 6,504,637 B1 | 1/2003 | Yokoyama et al. | |
| 6,859,307 B2* | 2/2005 | Takeda et al. | 359/337 |
| 6,907,200 B2 | 6/2005 | Okuno | |
| 2002/0003653 A1* | 1/2002 | Takeda et al. | 359/333 |
| 2002/0041618 A1* | 4/2002 | Watanabe et al. | 372/76 |
| 2002/0044322 A1* | 4/2002 | Blumenthal et al. | 359/161 |
| 2002/0080447 A1* | 6/2002 | Fells et al. | 359/141 |
| 2003/0228155 A1* | 12/2003 | Shen et al. | 398/186 |

(Continued)

OTHER PUBLICATIONS

Connelly, Michael, "Semiconductor Optical Amplifiers and Their Applications", Dept. Electronic and Computer Engineering University of Limerick, Limerick, Ireland, Design of Circuits and Integrated Systems Conf., Nov. 1998.*

(Continued)

*Primary Examiner* — Daniel Dobson
(74) *Attorney, Agent, or Firm* — Clements Bernard PLLC; Christopher L. Bernard; Lawrence A. Baratta, Jr.

(57) ABSTRACT

The present invention provides an optical networking device for re-amplifying, re-shaping, and re-timing an optical signal, as well as providing distortion compensation and performance monitoring of the optical signal. The optical networking device includes an all-optical regenerator device for one or more of re-amplifying, re-shaping, and re-timing the optical signal; a distortion compensator device for compensating for distortion associated with the optical signal; and a quality-of-signal monitoring device for measuring the quality of the optical signal. Preferably, the all-optical regenerator device, the distortion compensator device, and the quality-of-signal monitoring device are disposed within a single module. The quality-of-signal monitoring device measures the optical signal subsequent to distortion compensation. Alternatively, the quality-of-signal monitoring device measures the optical signal subsequent to distortion compensation and all-optical regeneration. In various embodiments, the quality-of-signal monitoring device provides feedback to the distortion compensator device, a distortion compensator device disposed along a line system, one or more of an optical amplifier and a distortion compensator device disposed along the line system, and a transmitter device disposed along the line system.

25 Claims, 4 Drawing Sheets

(56) References Cited

U.S. PATENT DOCUMENTS

| | | | |
|---|---|---|---|
| 2004/0105684 A1* | 6/2004 | Marutani et al. | 398/147 |
| 2005/0052727 A1* | 3/2005 | Kilper et al. | 359/334 |
| 2005/0078964 A1* | 4/2005 | Takahara et al. | 398/147 |
| 2005/0094252 A1* | 5/2005 | Haggans et al. | 359/337.1 |
| 2007/0014510 A1* | 1/2007 | Kusama | 385/16 |
| 2007/0053688 A1* | 3/2007 | Benz et al. | 398/27 |

OTHER PUBLICATIONS

Bohn, Marc, et al., "Tunable Dispersion Compensation in a 40 Gb/s System using a Compact FIR Lattice Filter in SiON Technology", European Conf. on Optical Communication, ECOC 2002, 2002, 2 pgs.*

Bohn, Marc, et al., "Tunable Dispersion Compensation in a 40 Gb/s System using a Compact FIR Lattice Filter in SiON Technology", European Conf. on Optical Communication, ECOC 2002, 2002, 2 pgs.*

Connelly, Michael, Semiconductor Optical Amplifiers and Their Applications; Dept. Electronic and Computer Engineering University of Limerick, Limerick, Ireland, 6 pgs.

"The Enhanced Functionalities of Semiconductor Optical Amplifiers and their Role in Advanced Optical Networking", Sep. 2004, INPHENIX, Inc., 13 pgs., Livermore, CA.

Koc, Ut-Va, Adaptive Electronic Dispersion Compensator for Chromatic and Polarization-Mode Dispersions in Optical Communication Systems, Nov. 2004, 9 pgs., EURASIP-Journal on Applied Signal Processing, N.J.

Kilper, Bach, Blumenthal, Einstein, Landolsi, Preiss, Willner; "Optical Performance Monitoring", IEEE-Journal of Lightwave Technology, vol. 22, No. 1, 11 pgs., Jan. 2004, CA.

2 Cont. Design of Circuits and Integrated Systems Conf., Nov. 1998.

* cited by examiner

ALL-OPTICAL REGENERATOR AND OPTICAL NETWORK INCORPORATING SAME

FIELD OF THE INVENTION

The present invention relates generally to an all-optical regenerator (AOR) and an optical network incorporating the same. More specifically, the present invention relates to an AOR that re-amplifies and re-shapes an optical signal, and which incorporates a re-timing functionality, distortion compensation functionality, and a performance monitoring functionality.

BACKGROUND OF THE INVENTION

Over the course of the past decade, optical networks have evolved from simple single-channel synchronous optical network (SONET) regenerator-based links to multi-span, multi-channel optically amplified ultra-long-haul transport systems, necessitated by the high demand for increased bandwidth at a reduced cost. Typically, the cost of a well-designed high-capacity transport system is dominated by the number of optical-to-electrical (OE) and electrical-to-optical (EO) conversions that are required. As the reach and channel capacity of such transport systems continues to increase, it became necessary at some point to improve the granularity of the demand connections by introducing optical add/drop multiplexers (OADMs). Thus, if a given node requires only small demand connectivity, most of the optical channels are expressed through the node without optical-electrical-optical (OEO) regeneration. Optical network costs are correspondingly reduced, even taking into account the increased costs of the OADMs. More recently, the optical networking industry has been aggressively pursuing a natural extension of this philosophy, moving towards all-optical "analog" core networks, with each demand encountering electrical digital circuitry only at the ingress/egress nodes. Not surprisingly, this is expected to produce a substantial elimination of OEO-related costs, an increase in optical network capacity, and nominally simpler operation and service.

At the same time, such all-optical "analog" core networks require a large amount of complicated hardware and software for monitoring and manipulating the high-bit rate optical signals that they carry. New and more complex modulation formats that provide resiliency with respect to both optical noise and nonlinear propagation effects are important for extended un-regenerated reach. More sophisticated optical amplifiers provide lower optical noise for extended reach and increased spectral bandwidth for increased wavelength counts reduce wavelength blocking probabilities. All-optical "analog" core networks also require mechanisms for mitigating optical power transients, controlling spectral flatness, and dynamically managing changes (e.g. in chromatic dispersion (CD) and polarization mode dispersion (PMD)). Because signals now stay in the optical domain, optical performance monitoring techniques are required for fault isolation and correction. The efficient routing of optical signals also requires sophisticated switching nodes with the ability to selectively steer the optical signals towards different directions with single-channel spectral granularity. Most of these technologies are not modular in nature and require an interruption in service if not deployed during initial system installation, thereby increasing initial installation substantially, even if initial capacity loading is small.

As the signal bit rate in an optical network increases, the distortion accumulated by the optical signal increase at a high rate. For example, CD may severely affect the propagating signal by inducing strong group velocity dispersion. Typical 2.5 Gb/s optical signals have a dispersion tolerance of approximately 17,000 ps/nm, which is equivalent to approximately 1,000 km of non-dispersion-shifted fiber (NDSF) at 1,550 nm. Increasing the signal bit rate to 10 Gb/s, as is typical in current optical networks, reduces this dispersion tolerance by a factor of 16 to approximately 1,100 ps/nm, which is equivalent to approximately 65 km of NDSF. Increasing the signal bit rate further to 40 Gb/s, as is expected in state-of-the-art optical networks, reduces this dispersion tolerance by another factor of 16 to approximately 70 ps/nm, which is equivalent to approximately 4 km of NDSF. Other optical signal distortions may be associated with PMD and with nonlinear propagation effects present in the optical fiber.

The validation of systems and software targeting a specific optical network design is complex. Only a small fraction of the optical network may be reproduced and represented at a given time, and many field configurations are dynamic and unpredictable. Thus, extra margin must be allocated to account for behavioral uncertainty. In order to reduce the complexity of both hardware technology and software algorithms, regions of network transparency may be established with optical signal regenerators forced at perimeters. Thus, "analog" regions are surrounded by "digital" regenerator interfaces. Again, the complexity and cost of an optical network may be substantially reduced via the introduction of more frequent, and inexpensive, optical signal regenerators. The present invention achieves this goal and adds additional functionalities to these optical signal regenerators.

BRIEF SUMMARY OF THE INVENTION

As described above, optical networks continue to increase in sophistication and complexity. Regenerators are used in such optical networks to clean up optical signals and mitigate accumulating noise and distortion. Regeneration is typically achieved via an OEO conversion. The present invention, however, achieves regeneration via an AOR. This AOR is used to re-amplify and re-shape the optical signal (2R) while keeping it purely in the optical domain. Optionally, a re-timing (3R) functionality is also provided. The AOR has advantages over regeneration achieved via an OEO conversion in terms of reduced size, cost, power consumption, etc.

Given the geographic reach of a typical optical network, and the associated environmental and measurement uncertainty, high-bit rate optical signals are often distorted to such an extent that an AOR may no longer be functional. Thus, the AOR of the present invention incorporates a distortion compensation functionality, and, preferably, a tunable distortion compensation functionality. This distortion compensation functionality is achieved in the optical domain with a tunable dispersion compensator, a tunable PMD compensator, a generic tunable distortion compensator, or the like.

AORs typically do not inherently provide a performance monitoring functionality. However, because tunable distortion compensators require a control signal indicative of the recovered signal quality, a separate performance monitoring element is provided that measures optical signal quality.

Thus, the present invention provides a fully-functional AOR node that combines an AOR with a tunable distortion compensator and a quality-of-signal (QoS) performance monitoring element. Advantageously, this configuration reduces the overall complexity and cost of the optical signal regeneration node relative to an OEO regeneration node, reduces the size and power consumption of the optical signal regeneration node relative to an OEO regeneration node, improves the reliability of the optical signal regeneration node relative to an OEO regeneration node, enhances the application space of AORs by providing associated distortion compensation, reduces the overall complexity and cost of optical networks, provides the full QoS capability required for fault isolation and correction, and enhances the level of format transparency of optical networks by decoupling the regeneration function from any specific optical signal protocol or framing structure.

In one exemplary embodiment of the present invention, an optical networking device for re-amplifying, re-shaping, and re-timing an optical signal, as well as providing distortion compensation and performance monitoring of the optical signal, includes an all-optical regenerator device for one or more of re-amplifying, re-shaping, and re-timing the optical signal; a distortion compensator device for compensating for distortion associated with the optical signal; and a quality-of-signal monitoring device for measuring the quality of the optical signal. Preferably, the all-optical regenerator device, the distortion compensator device, and the quality-of-signal monitoring device are disposed within a single module. The quality-of-signal monitoring device measures the optical signal subsequent to distortion compensation. Alternatively, the quality-of-signal monitoring device measures the optical signal subsequent to distortion compensation and all-optical regeneration. In various embodiments, the quality-of-signal monitoring device provides feedback to a distortion compensator device disposed along a line system, the quality-of-signal monitoring device provides feedback to one or more of an optical amplifier and a distortion compensator device disposed along the line system, and the quality-of-signal monitoring device provides feedback to a transmitter device disposed along the line system.

In another exemplary embodiment of the present invention, an optical network includes a node for one or more of re-amplifying, re-shaping, and re-timing an optical signal, as well as providing distortion compensation and performance monitoring of the optical signal, including an all-optical regenerator device for one or more of re-amplifying, re-shaping, and re-timing the optical signal; a distortion compensator device for compensating for distortion associated with the optical signal; and a quality-of-signal monitoring device for measuring the quality of the optical signal. The quality-of-signal monitoring device measures the optical signal subsequent to distortion compensation. Alternatively, the quality-of-signal monitoring device measures the optical signal subsequent to distortion compensation and all-optical regeneration. In various embodiments, the quality-of-signal monitoring device provides feedback to a distortion compensator device disposed along a line system of the optical network, the quality-of-signal monitoring device provides feedback to one or more of an optical amplifier and a distortion compensator device disposed along the line system of the optical network, and the quality-of-signal monitoring device provides feedback to a transmitter device disposed along the line system of the optical network.

BRIEF DESCRIPTION OF THE DRAWINGS

The present invention is illustrated and described herein with reference to the various drawings, in which like reference numbers are used to denote like system components and/or method steps, as appropriate, and in which.

DETAILED DESCRIPTION OF THE INVENTION

Figure 1:
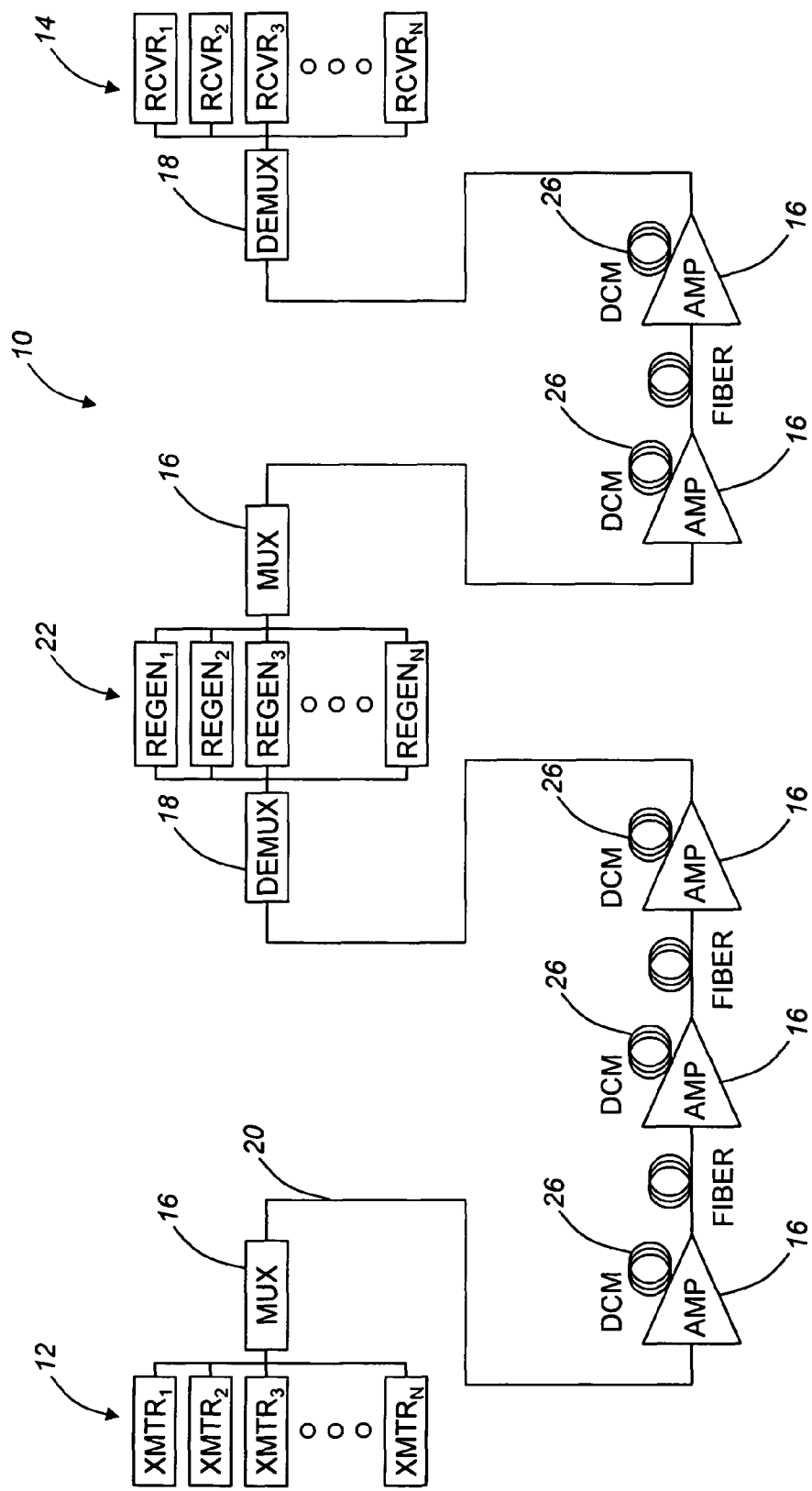
FIG. 1 is a schematic diagram illustrating one exemplary embodiment of an optical network incorporating the all-optical regenerator of the present invention.

Typically, a regenerator node must eliminate signal noise and distortion through its re-amplify and re-shape (2R) functionality. Optionally, the regenerator node also provides a re-time (3R) functionality. Preferably, however, the regenerator node further provides a data or signal quality monitoring functionality for tunable distortion compensation, as well as a data or signal quality monitoring functionality for fault isolation and correction switching mechanisms.

All-optical regenerators may be based on several principles, as described below. For example, all-optical regenerators may be based on cross-gain modulation (XGM), cross-phase modulation (XPM), or four-wave-mixing (FWM) in semiconductor optical amplifiers. Alternatively, all-optical regenerators may be based on nonlinear effects in optical fibers. In general, all-optical regeneration is a process that removes the noise from optical signals and restores the optical signals to well-defined levels for further transmission. This process may include re-amplification (1R); re-amplification and re-shaping (2R); or re-amplification, re-shaping, and re-timing (3R). 1R functionality is provided by erbium-doped fiber amplifiers (EDFAs), for example, and is an integral part of optical networks, overcoming optical signal losses due to transmission over optical fibers or at switching nodes. 2R and 3R functionalities are provided to allow scalable optical networks, preventing the inevitable data corruption. As described above, 2R and 3R functionalities are challenging using OEO mechanisms at high data rates (i.e. 40 Gb/s) due to cost concerns. Thus, semiconductor optical amplifiers (SOAs) are typically used to achieve 2R and 3R functionalities. For example, a Mach-Zehnder Interferometer (MZI) may be used that incorporates a SOA in each arm. The MZI has two inputs: the degraded data and control light at a different wavelength. The degraded data causes a gain reduction in one of the SOAs. This gain reduction produces a refractive index change that results in a phase change for the control light traveling through that SOA. This light then optically interferes with the non-phase-shifted beam from the other arm of the MZI at the output coupler. The induced phase difference causes the output light to be redirected from one output port to the other. This reshapes the distribution of any amplitude noise at the input of the regenerator and the output optical signal-to-noise (OSNR) is dramatically improved.

All-optical regeneration techniques that may be used in conjunction with the systems and methods of the present invention include those described in the following publications, among others: "All-Optical Wavelength Conversion and Regeneration," J. Leuthold, et al., Optical Fiber Communications Digest, 2004, Paper WNI (and references therein); "All-Optical 2R Regeneration in Scalable 40-Gb/s Wavelength-Division Multiplexed Networks," S. Boscolo, et al., J. Optical Networking, January 2003, pp. 10-16; "Fibre Optical Wavelength-Converter Employing Cross-Phase Modulation and Low-Threshold Non-Adiabatic Raman Compression," D. A. Chestnut, et al., Electronics Lett., Vol. 39, No. 15, July 2003; "Optical Regeneration at 40 Gb/s and Beyond," O. Leclerc, J. Lightwave Techn., November 2003, pp. 2779-2790 (and references therein); "Novel 3R Regenerator Based on Polarization Switching in a Semiconductor Optical Amplifier-Assisted Fiber Sagnac Interferometer," IEEE Photon. Techn. Lett., September 2003, pp. 1261-1263; "Regeneration Capabilities of Passive Saturable Absorber-Based Optical 2R in 20-Gb/s RZ DWDM Long-Haul Transmissions," F. Seguineau, et al., Electronics Lett., Vol. 39, No. 11, May 2003; and "Triple 640 km Cascade of Tunable All Optical Regenerators in a 10 Gb/s WDM Field Trial Over 160 km Per Span Distance in MCI's Metro Network," D. Chen, et al., European Conf. on Optical Communication Proceedings, 2005, paper We2.4.2.

Referring to FIG. 1, illustrating one exemplary embodiment of an optical network incorporating the all-optical regenerator of the present invention, the optical network 10 includes a plurality of optical transmitters (XMTRs) 12 and a plurality of optical receivers (RCVRs) 14. The optical network 10 also includes a plurality of multiplexers (MUXs) 16 for multiplexing the plurality of optical signals from the plurality of XMTRs 12 onto an optical fiber 20, and for multiplexing the plurality of optical signals from a plurality of all-optical regenerators 22 onto the optical fiber 20. Correspondingly, the optical network 10 includes a plurality of demultiplexers (DEMUXs) 18 for demultiplexing the optical signal from the optical fiber 20 to the plurality of all-optical regenerators 22, and for demultiplexing the optical signal from the optical fiber 20 to the plurality of RCVRs 14. The optical network 10 further includes a plurality of optical amplifiers (AMPs) 24 and a plurality of dispersion compensating modules (DCMs) 26 associated with the plurality of AMPs 24 disposed along the line system. Alternatively or additionally, the optical network 10 may include dispersion compensating fiber (DCF) or the like. It should be noted that multiple all-optical regenerators 22 with the same architecture may be cascaded.

In general, dispersion compensation techniques include: DCF optimization, the use of etalons, the use of fiber Bragg gratings, the use of planar light-wave circuits (PLCs), and electrical dispersion compensation (EDC) by signal pre-distortion, in addition to the use of non-zero dispersion shifted fiber (NZDSF). NZDSF is manufactured with a more perfectly circular fiber core and a more complex refractive index profile than conventional single-mode fiber, resulting in less dispersion than conventional single-mode fiber. Disadvantageously, NZDSF addresses only PMD, described in greater detail herein below, and exacerbates slope mismatch dispersion, also described in greater detail herein below.

DCF optimization involves placing spools of DCF at predetermined intervals along the optical network—approximately 15 km of DCF for approximately every 80 km of optical fiber, for example. These spools of DCF are typically stacked on top of telecommunications racks. Disadvantageously, DCF optimization addresses only CD, described in greater detail herein below, and is typically set up to accurately correct CD on a center wavelength of multiple wavelengths carried on an optical fiber. Thus, dispersion accumulates at the other wavelengths and creates a problem at the edge of a band of wavelength channels.

The use of etalons involves using a Fabry-Perot interferometer arranged with two flat reflecting surfaces that are aligned to be parallel, and either a transparent plate (such that reflections from both of the flat reflecting surfaces are exploited) or an air gap in between the two flat reflecting surfaces. The etalon acts as an optical resonator or cavity, optionally with controllable resonant frequency, providing CD.

The use of fiber Bragg gratings involves using multiple short lengths of fiber that each reflect a particular wavelength. Fiber Bragg gratings incorporate periodically spaced zones in an optical fiber core that each have a predetermined refractive index that is slightly higher than the optical fiber core, for example. This structure selectively reflects a predetermined range of wavelengths, while selectively transmitting other wavelengths. Fiber Bragg gratings are each typically between about 1 mm and about 25 mm long, and are formed by selectively exposing an optical fiber to ultraviolet (UV) light. Advantageously, fiber Bragg gratings have relatively low insertion loss when inserted into an optical network, as a given light wave is not routed outside of the optical fiber.

The use of PLCs involves using PLC chips incorporating MZIs, for example, to compensate for CD and the like. Advantageously, these devices have relatively low insertion loss when inserted into an optical network, are quickly tunable, and are relatively simple to operate.

EDC by signal pre-distortion involves pre-distorting the amplitude and phase waveforms of a transmitted signal in order to achieve dispersion compensation. Advantageously, these techniques eliminate the need for bulky and expensive optical dispersion compensation components.

DCMs incorporate DCF optimization, the use of etalons, the use of fiber Bragg gratings, the use of PLCs, and/or a variety of other dispersion compensation techniques. These devices are placed in front of the receivers in an optical network and make continual signal adjustments based on information derived from the analysis of a sample of an optical pulse as it travels through the DCM. The degree to which the optical pulse is corrected is based on its state, as read by a detector associated with the DCM. Advantageously, DCMs are either remotely or adaptively tunable, have a relatively small form factor, and are relatively inexpensive and simple to replace.

In general, CD, or group velocity dispersion (GVD), is static in nature and is based on the principal that different colored pulses of light, with different wavelengths, travel at different speeds, even within the same mode, and is the sum of material dispersion and waveguide dispersion. Material dispersion is caused by the variation in the refractive index of the glass of an optical fiber as a function of the optical frequency. Waveguide dispersion is caused by the distribution of light between the core of an optical fiber and the cladding of the optical fiber, especially with regard to a single-mode fiber. CD concerns are compounded in today's high-speed transmission optical networks.

Slope mismatch dispersion is a subset of CD, and occurs in single-mode fiber because dispersion varies with wavelength. Thus, dispersion builds up, especially at the extremes of a band of wavelength channels. Slope mismatch dispersion compensation typically requires slope matching or tunable dispersion compensation at a receiver.

PMD is dynamic in nature and results as light travels down a single-mode fiber in two inherent polarization modes. When the core of an optical fiber is asymmetric, the light traveling along one polarization mode travels faster or slower than the light traveling along the other polarization mode, resulting in a pulse overlapping with others, or distorting the pulse to such a degree that it is undetectable by a receiver. Again, PMD concerns are compounded in today's high-speed transmission optical networks. Further, PMD varies dynamically with temperature changes, infinitesimal asymmetries in the optical fiber core, etc., and therefore requires adaptively tunable dispersion compensation.

Figure 2:
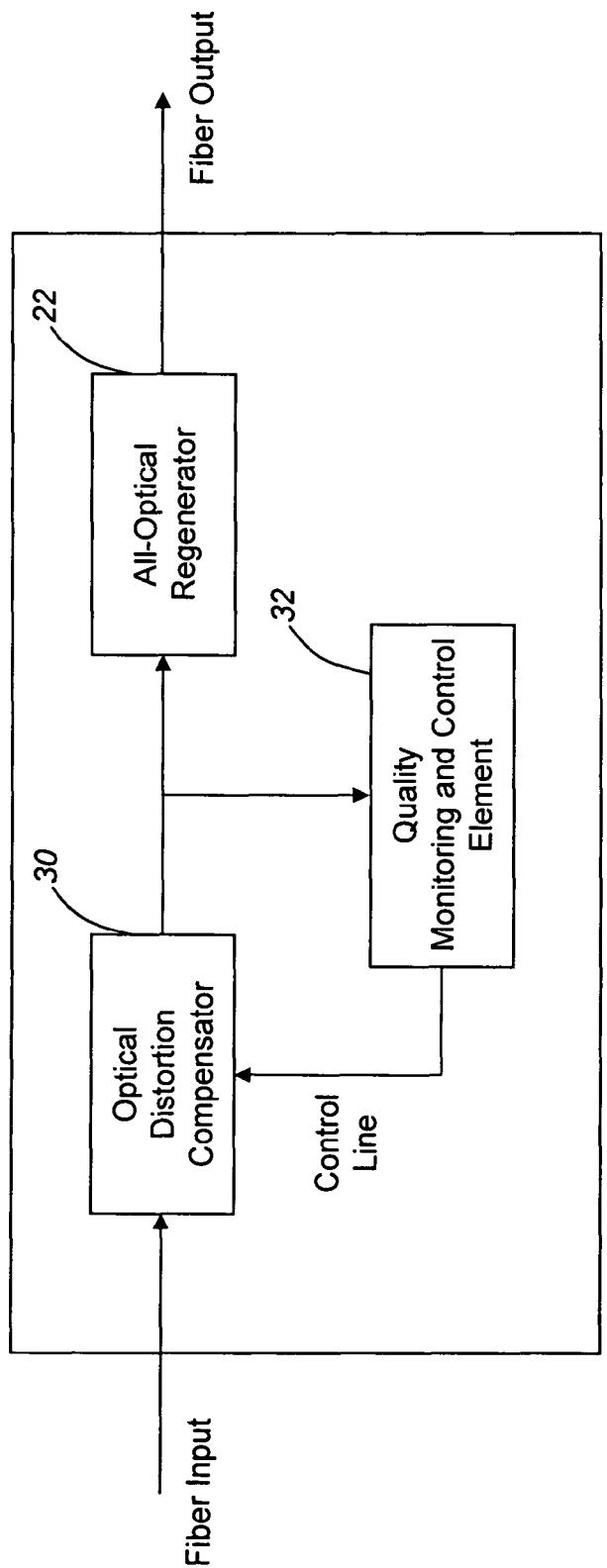
FIG. 2 is a schematic diagram illustrating one exemplary embodiment of the all-optical regenerator of the present invention, the all-optical regenerator having both distortion compensation and performance monitoring functionalities (with performance monitoring performed subsequent to distortion compensation)

Referring to FIG. 2, illustrating one exemplary embodiment of the all-optical regenerator of the present invention, the all-optical regenerator having both distortion compensation and performance monitoring functionalities (with performance monitoring performed subsequent to distortion compensation), the all-optical regenerator 22 includes, in addition to the 2R/3R functionalities described above, an optical distortion compensator 30 and a quality monitoring and control element 32. An optical signal entering the all-optical regenerator 22 first goes through distortion compensation via the optical distortion compensator 30, which operates using post-distortion compensation feedback from the quality monitoring and control element 32. The optical signal then goes through all-optical regeneration (2R/3R) via the all-optical regenerator 22 prior to being transmitted on for multiplexing, etc.

Figure 3:
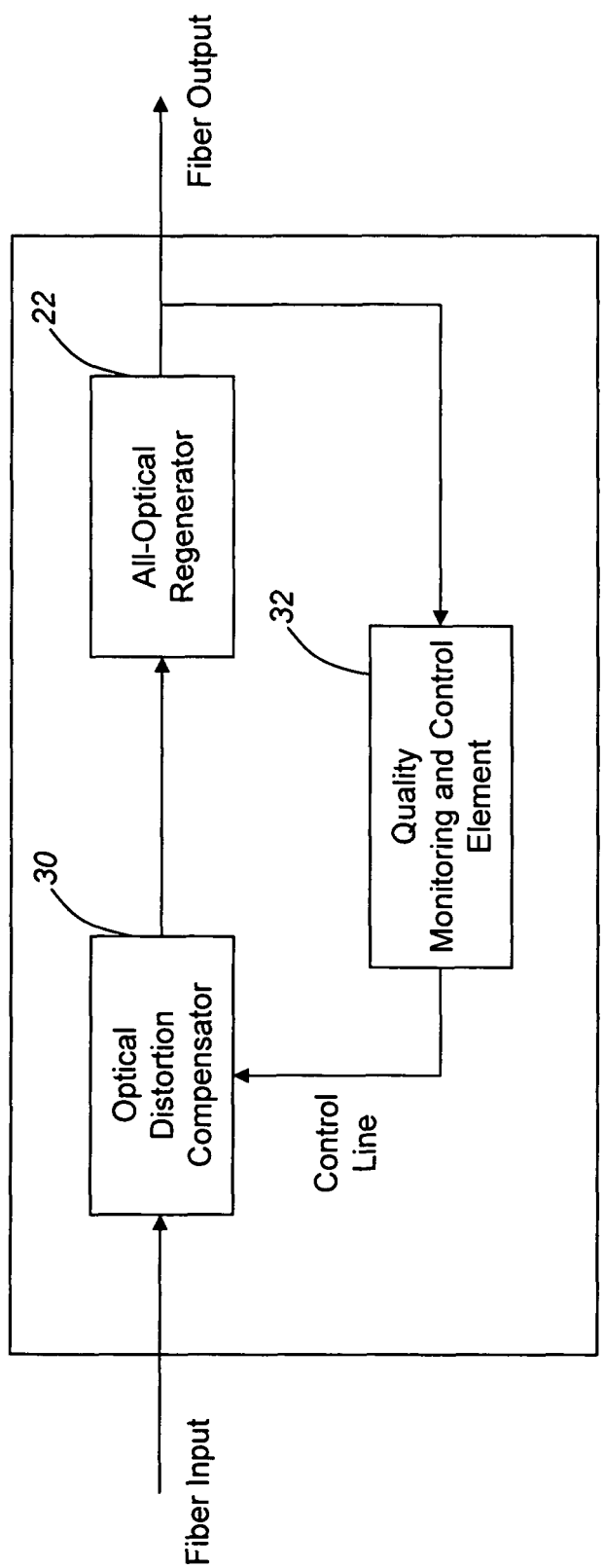
FIG. 3 is a schematic diagram illustrating another exemplary embodiment of the all-optical regenerator of the present invention, the all-optical regenerator having both distortion compensation and performance monitoring functionalities (with performance monitoring performed subsequent to distortion compensation and regeneration)

Referring to FIG. 3, illustrating another exemplary embodiment of the all-optical regenerator of the present invention, the all-optical regenerator having both distortion compensation and performance monitoring functionalities (with performance monitoring performed subsequent to distortion compensation and regeneration), the all-optical regenerator 22 again includes, in addition to the 2R/3R functionalities described above, an optical distortion compensator 30 and a quality monitoring and control element 32. An optical signal entering the all-optical regenerator 22 first goes through distortion compensation via the optical distortion compensator 30, which operates using post-distortion compensation and post-regeneration feedback from the quality monitoring and control element 32. The optical signal then goes through all-optical regeneration (2R/3R) via the all-optical regenerator 22 prior to being transmitted on for multiplexing, etc.

One possible embodiment of an adaptive optical distortion compensator is based on a cascaded lattice filter structure. An optical signal encounters a series of dual-arm interferometers, with a tunable arm coupling ratio and a tunable relative arm delay and optical phase shift. Such filters are implemented on a PLC, for example, as described in references below.

Optical distortion compensators 30 that may be used in conjunction with the systems and methods of the present invention include those described in the following publications, among others: "Adaptive Minimum MSE Controlled PLC Optical Equalizer for Chromatic Dispersion Compensation," J. Lightwave Techn., October 2003, pp. 2322-2331; "Experimental Verification of Combined Adaptive PMD and GVD Compensation in a 40 Gb/s Transmission Using Integrated FIR-Filters and Spectrum Monitoring," M. Bohn, Optical Fiber Communications Digest, 2004, Paper TuG3; "Fiber Bragg Grating Dispersion Compensator by Single-Period Overlap-Step-Scan Exposure," L. G. Sheu, et al. IEEE Photon. Techn. Lett., July 2003, pp. 939-941; and "Optical All-Pass Filters for Phase Response Design With Applications for Dispersion Compensation," C. K. Madsen, et al., IEEE Photon. Techn. Lett., July 1998, pp. 994-996.

Quality monitoring and control elements 32 that may be used in conjunction with the systems and methods of the present invention include those that monitor an optical signal itself (see, e.g., "Optical Performance Monitoring," D. C. Kilper, et al., J. Lightwave Techn., Vol. 22, No. 1, January 2004, pp. 294-304), a linear photodiode with a radio frequency (RF) spectrum analyzer (see, e.g., "Experimental Verification of Combined Adaptive PMD and GVD Compensation in a 40 Gb/s Transmission Using Integrated FIR-Filters and Spectrum Monitoring," M. Bohn, Optical Fiber Communications Digest, 2004, Paper TuG3), those that use asynchronous sampling to estimate both eye shape and signal quality (see, e.g., Simple Measurement of Eye Diagram and BER Using High-Speed Asynchronous Sampling," I. Shake, J. Lightwave Techn., May 2004, pp. 1296-1302), those that monitor various frequency components (see, e.g., "Chromatic Dispersion Monitoring Using Partial Optical Filtering and Phase-Shift Detection of Bit Rate and Doubled Half Bit Rate Frequency Components," S. M. R. Montaghian Nezam, et al., Optical Fiber Communications Digest, 2004, Paper TuU2), and those that monitor externalities in order to ascertain a specific system property (see, e.g., U.S. Pat. No. 6,765,659, "Optical Supervisory Channel Apparatus for Measuring Optical Properties," V. Bhatnagar, et al., and U.S. Pat. No. 6,795,607, "Use of Tunable Laser for Optical Performance Monitoring in WDM Systems," J. L. Archambault, et al. In general, the optical impairments monitored by the above include noise—random optical signal fluctuations that may be optical signal-level dependent, distortion—the modification of the average optical signal waveform that may be optical signal-level or pattern dependent and that may lead to "bursty" errors and bit error rate (BER) floors, and timing—fluctuations in the time registration of bits that may occur bit-to-bit or accumulate over many bit periods. These optical impairments may be further sub-divided into component faults or malfunctions and transmission impairments, including, but not limited to, optical amplifier noise, optical amplifier distortion and transients, CD, PMD, fiber nonlinearity-induced distortion and crosstalk (single-phase modulation (SPM), XPM, FWM, stimulated Rayleigh scattering, and Brillouin scattering), timing jitter, polarization effects, interference effects (MPI), pump laser relative intensity noise (RIN) transfer, optical filter distortion, and linear crosstalk. The method utilized may take measurements from a variety of sources, including average power, peak power, pulseibit shape, eye diagrams, intensity/field autocorrelation, amplitude power spectrums, polarization states, wavelength variations, amplitude histograms, BERs, V-curve measurements, CD, PMD, as well as characteristics of the phase or optical carrier.

OSNR is one of the more widely used methods of measuring optical performance. Conventional technologies for measuring OSNR include Fabry-Perot filters, fiber Bragg gratings, free-space and micro-electromechanical system (MEMS) diffractive optics, and dielectric thin film filters. Modulation tone techniques have also been used to effectively monitor OSNR. A variety of monitoring techniques and methodologies may be used in conjunction with the conventional technologies described above to obtain meaningful OSNR measurements, such as optical polarization, out-of-band techniques, including optical sub-carrier monitoring and high/low frequency monitoring, as well as electronic spectral measurement techniques, including framing signal monitoring, homodyne signal nulling, and one-half clock frequency constellation monitoring.

OSNR measurements may be combined with or replaced by dispersion monitoring techniques. For example, CD may be detected by monitoring phase-modulation to amplitude-modulation conversions, RF power fading, including tonal and bit rate frequency detections, as well as vestigial sideband signal delays. PMD may be detected by monitoring the spectral RF tonal differences in the two polarization states with an optical fiber, or by measuring the phase difference between two optical frequency components for the two polarization states.

Figure 4:
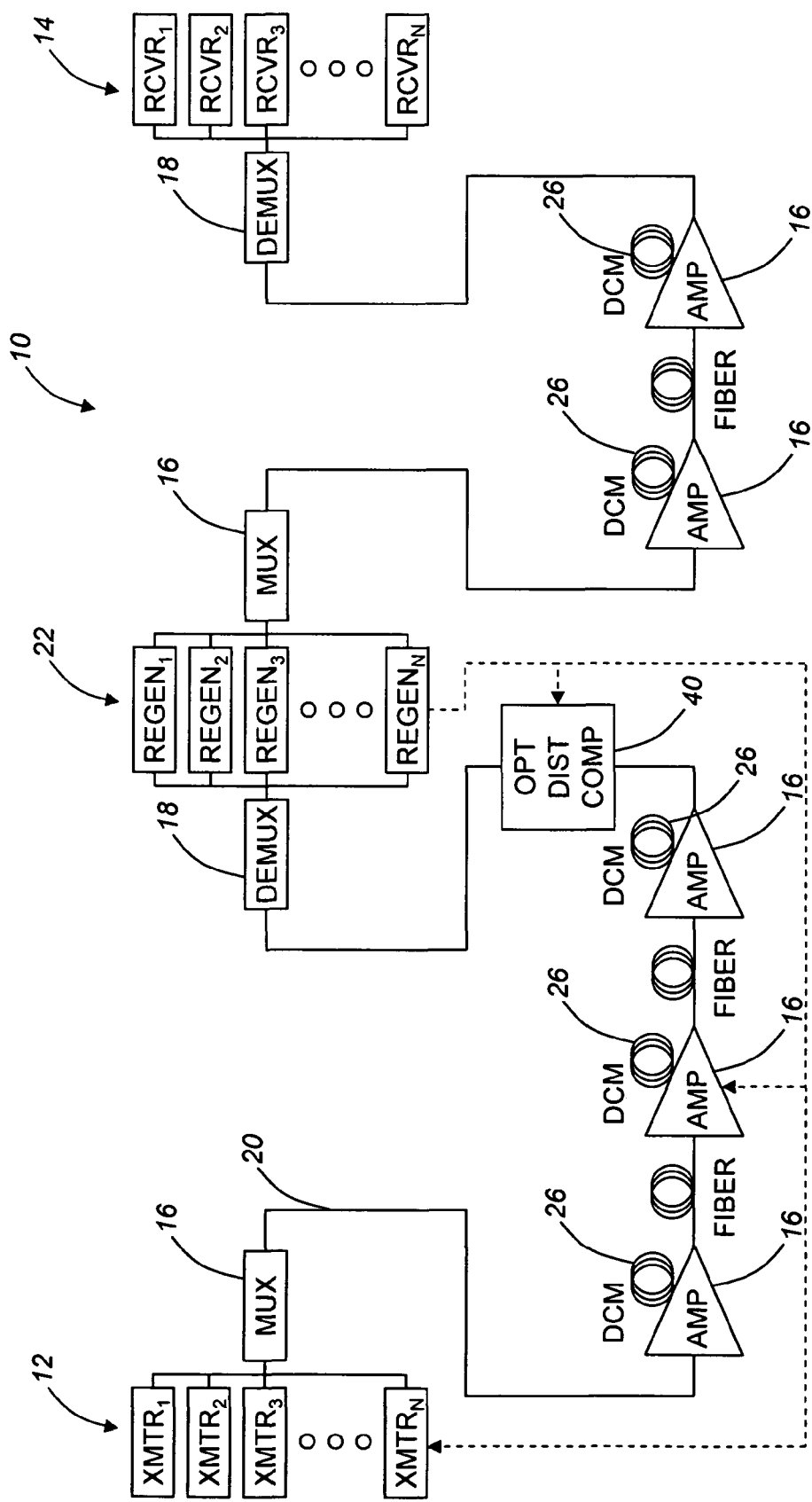
FIG. 4 is a schematic diagram illustrating another exemplary embodiment of an optical network incorporating the all-optical regenerator of the present invention, with optical signal compensation being distributed to elements along the line system or to the transmitter blocks in order to enable a pre-distortion approach, for example.

Referring to FIG. 4, illustrating another exemplary embodiment of an optical network incorporating the all-optical regenerator of the present invention, with optical signal compensation being distributed to elements along the line system or to the transmitter blocks in order to enable a pre-distortion approach, for example, the optical network 10 includes optical signal feedback that is transmitted from the quality monitoring and control element 32 (FIGS. 2 and 3) to one or more of an optical distortion compensator 40 that is disposed along the line system, an AMP 16 and DCM 26 that is disposed along the line system, or the XMTRs 12 in order to enable a pre-distortion approach, for example.

Advantageously, the configuration of the present invention reduces the overall complexity and cost of the optical signal regeneration node relative to an OEO regeneration node, reduces the size and power consumption of the optical signal regeneration node relative to an OEO regeneration node, improves the reliability of the optical signal regeneration node relative to an OEO regeneration node, enhances the application space of AORs by providing associated distortion compensation, reduces the overall complexity and cost of optical networks, provides the full QoS capability required for fault isolation and correction, and enhances the level of format transparency of optical networks by decoupling the regeneration function from any specific optical signal protocol or framing structure.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are contemplated by and fall within the spirit and scope of the present invention and are intended to be covered by the following claims.

What is claimed is:

1. An optical networking device for re-amplifying, re-shaping, and re-timing an optical signal, as well as providing distortion compensation and performance monitoring of the optical signal, comprising:
    an all-optical regenerator device for two or more of re-amplifying, re-shaping, and re-timing the optical signal;
    a distortion compensator device for compensating for distortion associated with the optical signal; and
    a quality-of-signal monitoring device for measuring the quality of the optical signal, wherein the quality of the optical signal is measured subsequent to demultiplexing and after the all-optical regenerator device and the distortion compensator device and before subsequent multiplexing and amplification of the optical signal, and wherein the quality-of-signal monitoring device is operable for performing fault isolation on a per channel basis;
    wherein the quality-of-signal monitoring device provides feedback to the distortion compensator device subsequent to demultiplexing and then the feedback-modified optical signal is provided to the all-optical regenerator device; and
    wherein the distortion compensator device compensates for one or more of chromatic dispersion, polarization mode dispersion, bandwidth limiting, and self-phase modulation associated with the optical signal.

2. The optical networking device of claim 1, wherein the all-optical regenerator device, the distortion compensator device, and the quality-of-signal monitoring device are disposed within a single module.

3. The optical networking device of claim 1, wherein the all-optical regenerator device comprises one or more of a cross-gain modulation device, a cross-phase modulation device, a four-wave-mixing device, and a self-phase modulation device.

4. The optical networking device of claim 1, wherein the all-optical regenerator device comprises a semiconductor optical amplifier device comprising a Mach-Zehnder interferometer with a semiconductor optical amplifier in each arm, wherein degraded data signal and control signal inputs are received.

5. The optical networking device of claim 1, wherein the all-optical regenerator device comprises one or more of a semiconductor optical amplifier, an electroabsorption modulator, a nonlinear optical loop mirror, a Mach-Zehnder interferometer, and a section of highly nonlinear optical fiber.

6. The optical networking device of claim 1, wherein the distortion compensator device comprises a tunable dispersion compensator device.

7. The optical networking device of claim 1, wherein the distortion compensator device comprises one or more of an optical lattice filter, an etalon filter, a polarization controller, and a modulator.

8. The optical networking device of claim 1, wherein the quality-of-signal monitoring device measures one or more of cumulative systematic signal distortion on each data bit and cumulative noise on each data bit.

9. The optical networking device of claim 1, wherein the quality-of-signal monitoring device comprises one or more of an optical sensor means for detecting an optical signal, an optical to electrical conversion means, and an electrical processing means for providing a control signal to the distortion compensator device.

10. The optical networking device of claim 1, wherein the quality-of-signal monitoring device provides feedback to a distortion compensator device disposed along a line system prior to demultiplexing.

11. The optical networking device of claim 1, wherein the quality-of-signal monitoring device provides feedback to one or more of an optical amplifier and a distortion compensator device disposed along a line system.

12. The optical networking device of claim 1, wherein the quality-of-signal monitoring device provides feedback to a transmitter device disposed along a line system.

13. An optical network, comprising:
    a node for two or more of re-amplifying, re-shaping, and re-timing an optical signal, as well as providing distortion compensation and performance monitoring of the optical signal, comprising:
        an all-optical regenerator device for two or more of re-amplifying, re-shaping, and re-timing the optical signal;
        a distortion compensator device for compensating for distortion associated with the optical signal; and
        a quality-of-signal monitoring device for measuring the quality of the optical signal, wherein the quality of the optical signal is measured subsequent to demultiplexing and after the all-optical regenerator device and the distortion compensator device and before subsequent multiplexing and amplification of the optical signal, and wherein the quality-of-signal monitoring device is operable for performing fault isolation on a per channel basis;

wherein the quality-of-signal monitoring device provides feedback to the distortion compensator device subsequent to demultiplexing and then the feedback-modified optical signal is provided to the all-optical regenerator device; and wherein the distortion compensator device comprises a tunable dispersion compensator device.

14. The optical network of claim 13, wherein the all-optical regenerator device comprises one or more of a cross-gain modulation device, a cross-phase modulation device, a four-wave-mixing device, and a self-phase modulation device.

15. The optical network of claim 13, wherein the all-optical regenerator device comprises a semiconductor optical amplifier device comprising a Mach-Zehnder interferometer with a semiconductor optical amplifier in each arm, wherein degraded data signal and control signal inputs are received.

16. The optical network of claim 13, wherein the all-optical regenerator device comprises one or more of a semiconductor optical amplifier, an electroabsorption modulator, a nonlinear optical loop mirror, a Mach-Zehnder interferometer, and a section of highly nonlinear optical fiber.

17. The optical network of claim 13, wherein the distortion compensator device compensates for one or more of chromatic dispersion, polarization mode dispersion, bandwidth limiting, and self-phase modulation associated with the optical signal.

18. The optical network of claim 13, wherein the distortion compensator device comprises one or more of an optical lattice filter, an etalon filter, a polarization controller, and a modulator.

19. The optical network of claim 13, wherein the quality-of-signal monitoring device measures one or more of cumulative systematic signal distortion on each data bit and cumulative noise on each data bit.

20. The optical network of claim 13, wherein the quality-of-signal monitoring device comprises one or more of an optical sensor means for detecting an optical signal, an optical to electrical conversion means, and an electrical processing means for providing a control signal to the distortion compensator device.

21. The optical network of claim 13, wherein the quality-of-signal monitoring device provides feedback to a distortion compensator device disposed along a line system of the optical network prior to demultiplexing.

22. The optical network of claim 13, wherein the quality-of-signal monitoring device provides feedback to one or more of an optical amplifier and a distortion compensator device disposed along a line system of the optical network.

23. The optical network of claim 13, wherein the quality-of-signal monitoring device provides feedback to a transmitter device disposed along a line system of the optical network.

24. An optical networking device for re-amplifying, re-shaping, and re-timing an optical signal, as well as providing distortion compensation and performance monitoring of the optical signal, comprising:

an all-optical regenerator device for two or more of re-amplifying, re-shaping, and re-timing the optical signal;

a distortion compensator device for compensating for distortion associated with the optical signal; and a quality-of-signal monitoring device for measuring the quality of the optical signal, wherein the quality of the optical signal is measured subsequent to demultiplexing and after the all-optical regenerator device and the distortion compensator device and before subsequent multiplexing and amplification of the optical signal;

wherein the quality-of-signal monitoring device provides feedback to the distortion compensator device subsequent to demultiplexing and then the feedback-modified optical signal is provided to the all-optical regenerator device; and wherein the distortion compensator device comprises a tunable dispersion compensator device.

25. The optical networking device of claim 24, wherein the quality-of-signal monitoring device is operable for performing fault isolation on a per channel basis.

* * * * *